US006924629B1

(12) United States Patent
Mueller et al.

(10) Patent No.: US 6,924,629 B1
(45) Date of Patent: *Aug. 2, 2005

(54) DEVICE AND METHOD FOR CONTROLLING A GENERATOR

(75) Inventors: Wolfgang Mueller, Stuttgart (DE); Oliver Luz, Lichtenwald (DE); Richard Schoettle, Ölbronn (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 407 days.

(21) Appl. No.: 09/169,060

(22) Filed: Oct. 9, 1998

(30) Foreign Application Priority Data

Oct. 11, 1997 (DE) .......................................... 197 45 114
Feb. 3, 1998 (DE) .......................................... 198 04 096

(51) Int. Cl.$^7$ ................................................. H02P 9/10
(52) U.S. Cl. ............................. 322/28; 322/36; 322/99
(58) Field of Search ............................. 322/17, 22, 25, 322/27, 28, 29, 99, 94, 89

(56) References Cited

U.S. PATENT DOCUMENTS

| | | | | |
|---|---|---|---|---|
| 4,079,306 A | * | 3/1978 | Mori et al. ................... | 322/28 |
| 4,733,159 A | * | 3/1988 | Edwards et al. ............. | 323/282 |
| 4,825,139 A | * | 4/1989 | Hamelin et al. ............. | 322/90 |
| 4,831,322 A | | 5/1989 | Mashino et al. ............. | 322/28 |
| 5,448,154 A | * | 9/1995 | Kanke et al. ................. | 322/28 |
| 5,543,703 A | * | 8/1996 | Kusase et al. ................ | 322/16 |
| 5,714,871 A | | 2/1998 | Endou ......................... | 322/28 |
| 5,726,557 A | * | 3/1998 | Umeda et al. ............... | 322/21 |
| 5,793,625 A | * | 8/1998 | Balogh ........................ | 363/89 |
| 5,942,818 A | * | 8/1999 | Satoh et al. .................. | 310/46 |

FOREIGN PATENT DOCUMENTS

| | | |
|---|---|---|
| EP | 0 325 520 | 7/1989 |
| EP | 0 507 663 | 10/1992 |
| EP | 0 740 389 | 10/1996 |
| EP | 0 777 309 | 6/1997 |
| JP | 08 023642 | 1/1996 |

OTHER PUBLICATIONS

Comprehensive Dictionary of Electrical Engineering, pp. 68 and 611 (Philip A. Laplante ed., 1999).*

* cited by examiner

*Primary Examiner*—Nicholas Ponomarenko
(74) *Attorney, Agent, or Firm*—Kenyon & Kenyon

(57) ABSTRACT

A device and a method for the control of a generator, for example a claw-pole generator, with which the rectifier bridge connected to the generator can be temporarily short-circuited, as a result of which power is temporarily stored in the stator inductors, which results in higher phase voltages. Suitable selection of the control frequency for a transistor, which makes the short-circuiting of the diode bridge possible, allows an output voltage of the generator to be set to the desired voltage level which is clearly higher than the conventional vehicle electrical system voltage. The diode bridge itself can be replaced by controllable switching elements (transistors) and a voltage adjustment is implemented using suitable controls.

33 Claims, 4 Drawing Sheets

DEVICE AND METHOD FOR CONTROLLING A GENERATOR

FIELD OF THE INVENTION

The present invention relates to a device and a method for controlling a generator, for example, a three-phase generator that can be driven by an internal combustion engine in a motor vehicle.

BACKGROUND INFORMATION

At the present time, claw-pole generators are customarily used to produce the electrical power required in a motor vehicle. These claw-pole generators are three-phase generators whose output current is rectified using a diode bridge. The rectified current is then used to supply the electrical loads of the vehicle and to charge the battery.

Such a three-phase generator includes a field coil through which field current flows. The field current is regulated with the aid of a voltage regulator so that the output voltage of the generator is approximately constant independently of the rotational speed of the generator. The level of voltage at which the regulator is set is customarily selected so that it is optimally suited for charging the battery. Depending on various conditions, the voltage is between approximately 12 and 14.5 V.

In vehicle electrical systems with a large number of loads, there is the problem that a 12-V system is not adequate for the supply of power. In particular for the supply of loads requiring a higher voltage than 12 V, there are conventional methods by which the generator is regulated at least temporarily to higher voltages such as 40 V, for example. This higher voltage is then made directly available to the load in question. The lower voltage required for the supply of the vehicle electrical system or for battery charging is derived from the higher voltage with the aid of a DC-DC converter. Since, in addition to power transistors, diodes and capacitors, conventional DC-DC converters also require inductive components, they are relatively expensive. This applies to transformer (potential-free) converters with a transformer and filter choke and to non-floating choke transformers with a storage choke. Such a generator control with a DC-DC converter is described in European Patent No. 0 325 520.

SUMMARY OF THE INVENTION

The devices according to the present invention and the method according to the present invention for the control of a generator have the advantage that they can also be used with a conventional generator. In such a conventional generator, particularly a claw-pole generator, it is possible to adjust voltage to a vehicle electrical system with a higher voltage level, e.g., approximately 42 V. This voltage adjustment is also possible as long as the output voltage of the generator in the lower rotational speed range with conventional field current regulation is lower than 42 V. In one embodiment of the present invention, no supplementary chokes are required in this connection, since the stator inductors already present in any event are used as storage chokes. In an advantageous manner, this can result in lower system costs and reduced space requirements.

These advantages are obtained by connecting an additional circuit arrangement to the rectifier bridge of the generator via which the rectifier bridge can be short-circuited for brief periods of time. This results in the generator being boosted. As long as the flow of power from the generator to the battery is interrupted, the power generated is stored temporarily in the stator inductors of the generator. This results in an increase of the so-called phase voltage. In another embodiment of the present invention, the short-circuiting and the re-interruption of the electrical connection of the rectifier bridge take place using a controllable power transistor in such a way that the output voltage of the generator that can be picked off at the rectifier bridge is increased to values amounting to approximately 42V.

In another embodiment of the present invention, the circuit arrangement with which the rectifier bridge can be short-circuited includes, in addition to the power transistor such as an MOSFET, a diode and a capacitor which are connected in such a way that the diode prevents the battery or the vehicle electrical system from being short-circuited. The capacitor is connected in parallel to the battery and, in an advantageous manner, smoothes the output voltage which can be drawn off.

According to another embodiment of the present invention, the booster transistor can be eliminated if a fully controlled rectifier bridge is implemented with controlled circuit breakers; a higher efficiency of the total system can then be obtained in an advantageous manner, since the forward power losses are lower with a proper selection of the circuit breakers than in an uncontrolled rectifier bridge constructed with diodes. In an advantageous manner, MOS field effect transistors can be used as controlled circuit breakers.

If a circuit breaker is additionally used instead of a freewheeling diode, forward power losses can be further reduced; this applies in particular to a case in which the circuit breakers are embodied as MOS field effect transistors. It is particularly advantageous that reduction of the number of components and an increase in the efficiency of the overall arrangement can be achieved in comparison with conventional arrangements.

DETAILED DESCRIPTION

Figure 1:
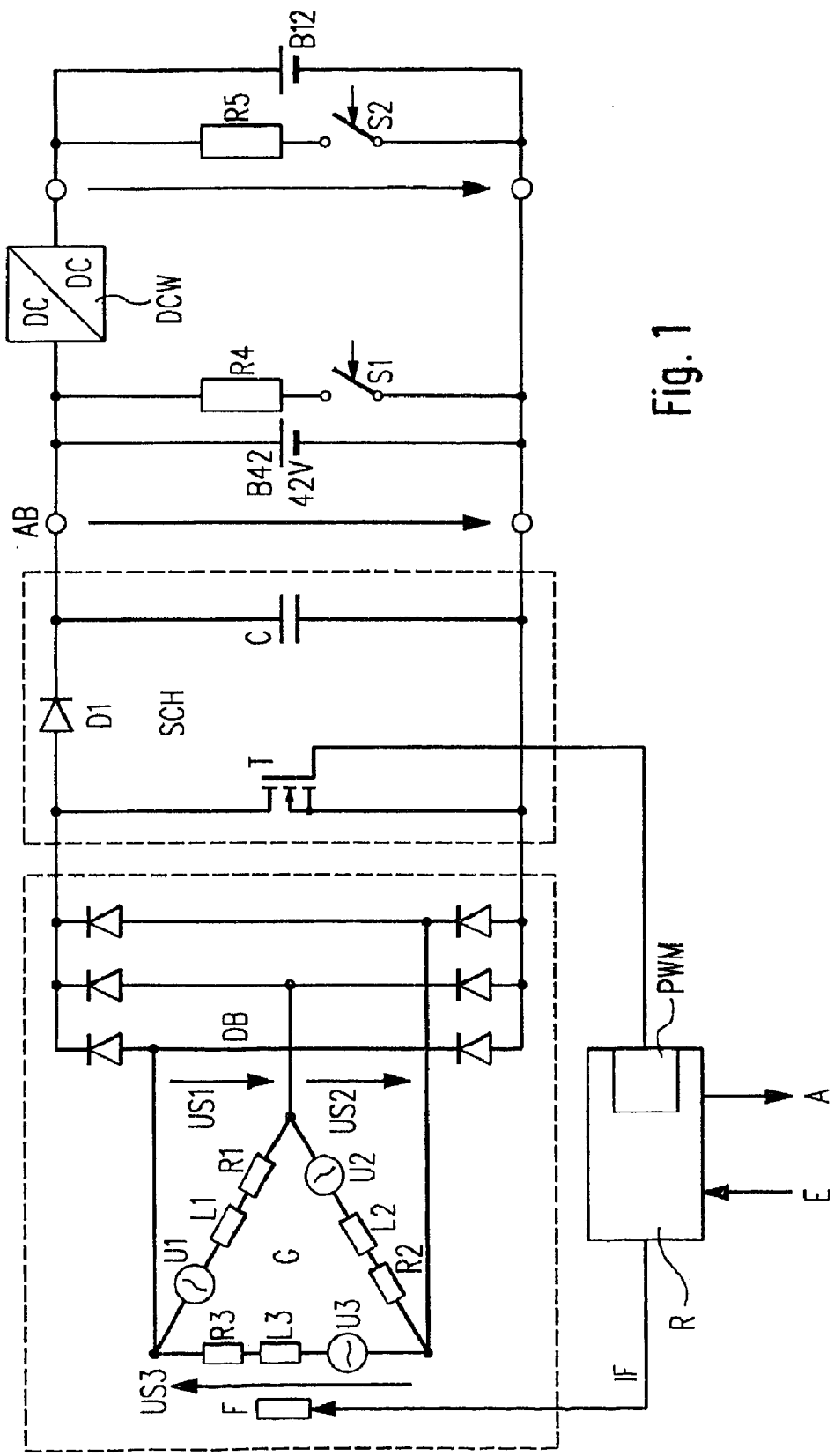
FIG. 1 shows a first embodiment of a device according to the present invention.

As shown in FIG. 1, generator G (e.g., a claw-pole generator) includes stator inductors L1, L2 and L3 and resistors R1, R2 and R3 which represent the winding resistors. The generator produces phase voltages US1, US2, US3 which are formed from synchronous generated voltages U1, U2, U3 and the voltages at resistors R1, R2, R3 and stator inductors L1, L2, L3. These voltages result in currents I1, I2, I3, which are rectified via diode bridge DB and in generator output current IG which serves to supply the vehicle electrical system loads.

Generator G is controlled in the customary manner using a voltage regulator R, which regulates field current IF through field winding F in such a way that a specifiable voltage is obtained. Input signals E, such as various voltages and/or currents and/or the generator rotational speed, are supplied to voltage regulator R. Voltage regulator R is capable of emitting output signals A with the aid of which switches or the like can be actuated, for example.

A circuit arrangement SCH including a transistor T, a diode D and a capacitor C is connected to generator G. The circuit arrangement SCH makes the generator control according to the present invention possible in that transistor T, which is an MOS field effect transistor connected parallel to diode bridge DB, for example, short-circuits diode bridge DB from time to time. In the exemplary embodiment, transistor T is made conducting or non-conducting using a pulse width modulation stage PWM, which is integrated in voltage regulator R. The pulse frequency of transistor T is in the medium frequency range and is determined by pulse width modulation stage PWM.

This pulse width modulation stage does not necessarily have to be integrated into voltage regulator R, but rather it can, for example, be constructed as a separate stage or integrated in the electronic control unit of the vehicle. Other controls of transistor T are also conceivable.

Brief short-circuiting of diode bridge DB with power transistor T causes the flow of power from generator G to battery B to be interrupted. This makes boosting of the generator possible. In this connection, power is stored temporarily in stator inductors L1 L2 and L3 of generator G. Diode D1 prevents current from flowing back and short-circuiting and discharging the downstream electrical system or battery B. If transistor T blocks, the power stored in the stator inductors is released in the form of induced voltages which are combined with the respective synchronous generated voltages U1, U2 and U3. This results in a higher output voltage of the generator. An output voltage of 42 V can be set by suitable variation of the conduction and blocking duration;. 42 volts charging voltage corresponds to 36 volts rated voltage. Capacitor C at the output of circuit arrangement SCH serves to smooth out the pulsed output current. In other respects, circuit arrangement SCH may be designated as a generator step-up converter.

If the generator control is to take place using circuit arrangement SCH so that a voltage present at the output of circuit arrangement SCH which is substantially increased in relation to the conventional generator voltage and is 42 V, for example, the conventional vehicle electrical system must be supplied using a DC-DC voltage converter. Electrical system loads to be supplied with higher voltage, a windshield heater R4, for example, can be directly connected to the 42 V via a switch S1 Loads R5, on the other hand, can be connected to 12 V via switch S2. Each voltage level has a separate battery, which are identified in FIG. 1 as B42 and B12.

In the design of the total system it must be taken into account that diode bridge DB should be designed so that it is suitable for 42 V. Also generator G must be designed so that an output voltage of 42 V is handled without problems. The voltage regulator or pulse width modulation stage PWM must be designed in such a way that necessary control signals can be generated. In a microprocessor-controlled system, the control signals can be supplied by the microprocessor which may also be the electronic control unit of the internal combustion engine.

Figure 2:
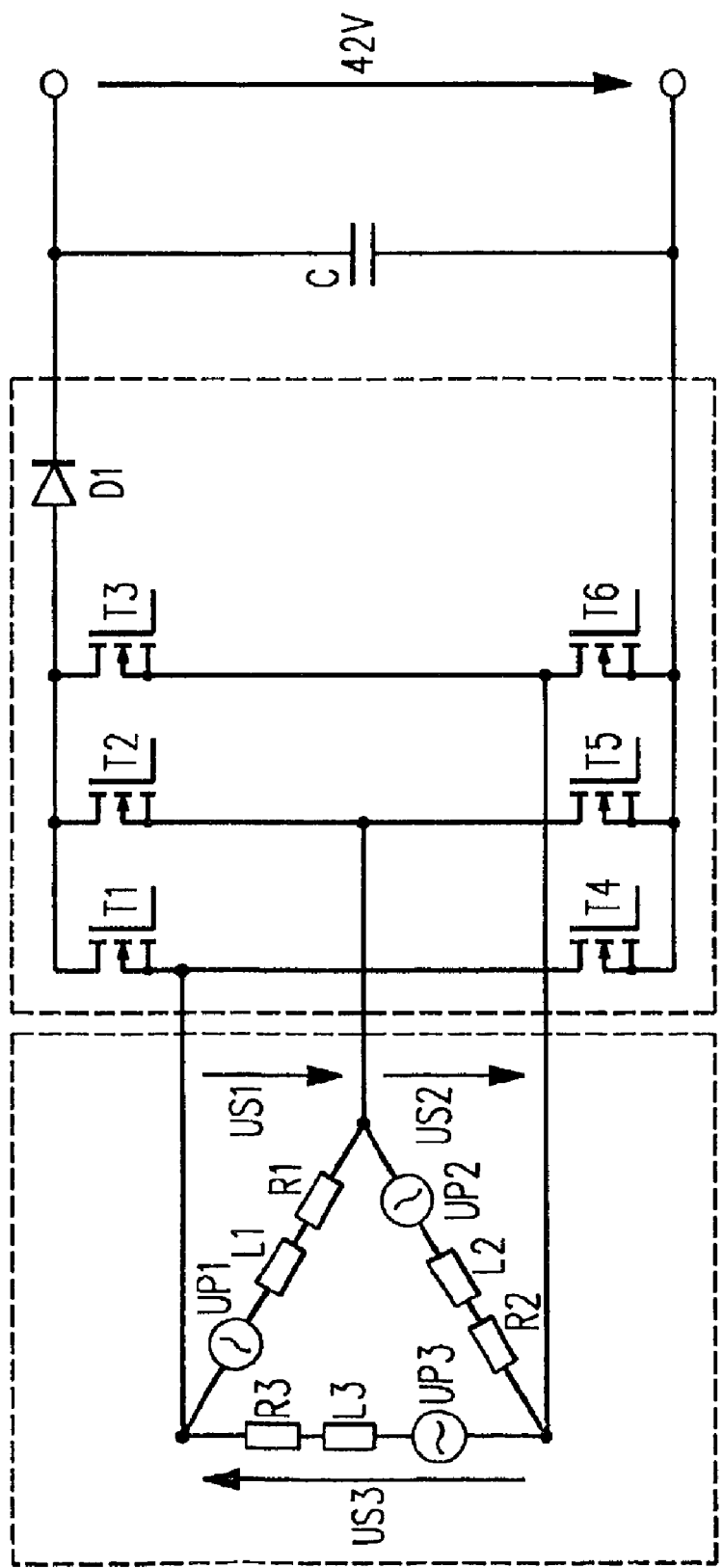
FIG. 2 shows a second embodiment of the device according to the present invention.
Figure 3:
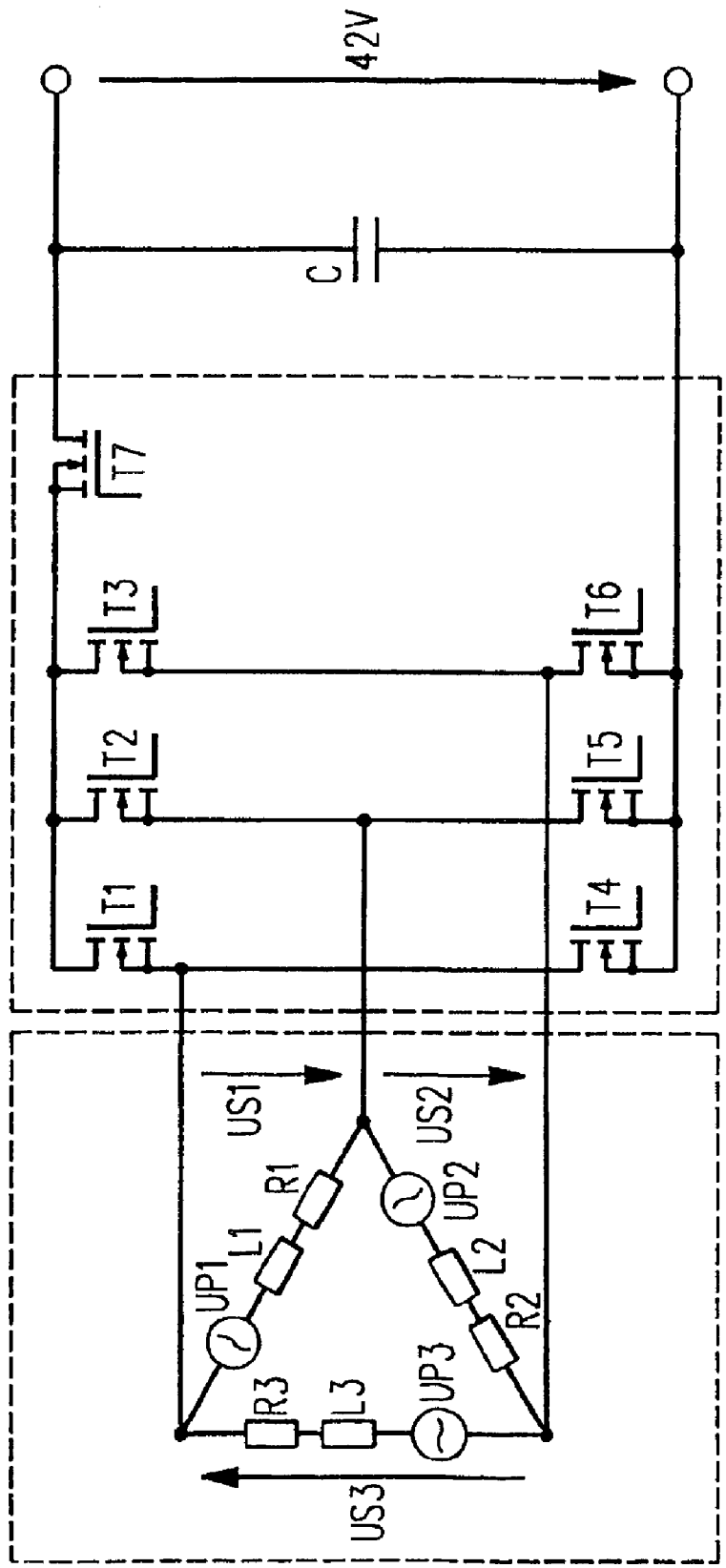
FIG. 3 shows a third embodiment of the device according to the present invention.

FIGS. 2 and 3 show two additional exemplary embodiments according to the present invention in which the field winding and the voltage regulator and the second voltage level, which are shown in FIG. 1, are also basically present; however, they are not shown in detail. In both exemplary embodiments, rectifier bridge BD has been replaced by a fully controlled bridge with six circuit breakers, transistors T1 to T6, for example. Diode D1 serves as a freewheeling diode which must be considered a component of the fully controlled bridge and is connected to capacitor C. In the exemplary embodiment shown in FIG. 3, the freewheeling diode has been replaced by an additional transistor T7 which is also a component of the fully controlled bridge.

The exemplary embodiments shown in FIGS. 2 and 3 illustrate two options for voltage adjustment, for a claw-pole generator to a higher electrical system voltage, for example, which are to be understood as a measure according to the present invention. The mode of operation of these circuits can be explained as follows:

A simultaneous activation of the six circuit breakers or transistors T1 to T6 of the fully controlled bridge circuit brings about a boost of generator G. MOS field effect transistors, for example, can be used as circuit breakers. During the phases in which circuit breakers T1 to T6 are conductive, power is temporarily stored in stator inductors L1, L2 and L3 and is released in the blocking phase of the transistors and results in an increase in phase voltages US1, US2 and US3. This causes generator G, which is driven by a shaft of an internal combustion engine, to make a higher voltage available for the production of an electrical system voltage level of 42 V, for example, particularly in the lower rotational speed range. Diode D1 of the exemplary embodiment shown in FIG. 2 prevents battery B42 from also being short-circuited and discharged during the conducting phase of circuit breakers or transistors T1 to T7.

In the exemplary embodiment shown in FIG. 3, an additional circuit breaker, an MOS field effect transistor T7 is used instead of a diode. This switch is controlled in such a way that it has its blocking phase during the conducting phase of the transistors of the bridge circuit and has its conducting phase during their blocking phase. This method corresponds to a synchronous rectification. The output voltage can be regulated to 42 V by proper variation of the conducting and blocking time, for example by variation of the mark-to-space ratio, i.e., the ratio between conducting and non-conducting phases. Voltages other than 42 V can of course also be obtained if necessary.

Capacitor C at the output of the integrated step-up converter T1 to T6 and D1, T1 to T6, T7 serves to smooth out the output voltage.

The six circuit breakers (field effect transistors) are preferably controlled by pulse width modulation; however other control methods are possible. The deadbeat principle or a pulse sequence modulation can be considered as possible control methods. Basically, conventional components such as MOS field effect transistors, insulated gate bipolar transistors (IGBT) or bipolar transistors can be used as circuit breakers. If circuit breakers are used in the bridge circuit, it must be made certain that the switch has a freewheeling diode with an inverse-parallel connection. Since this is the case with an MOS field effect transistor as a result of the manufacturing process, this component is preferably used. If a component that does not have this body diode is used as a circuit breaker, a freewheeling diode must be used as a discrete component.

Figure 4:
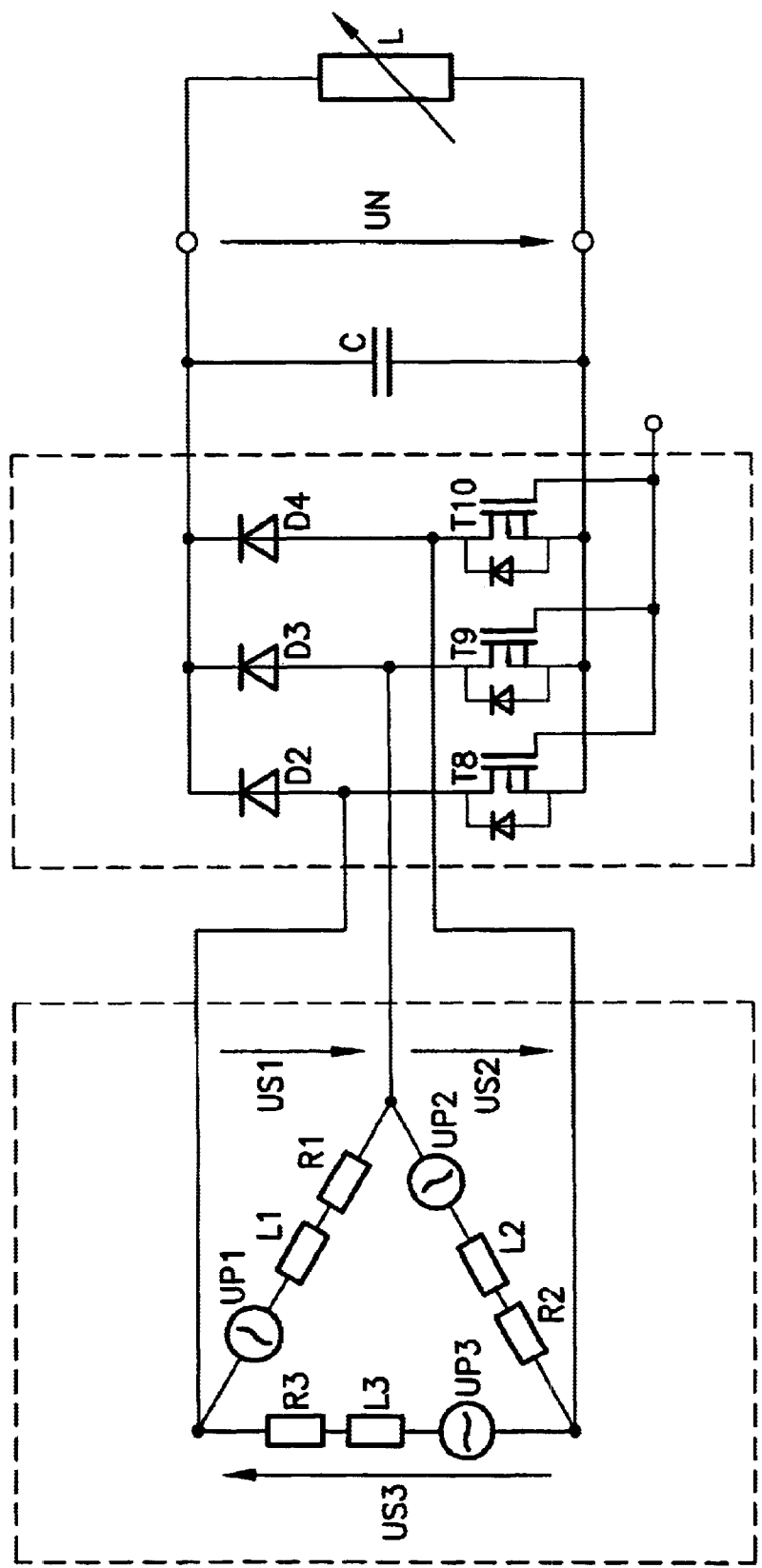
FIG. 4 shows a fourth embodiment of the device according to the present invention.

FIG. 4 shows another exemplary embodiment of the present invention, in which the bridge rectifier of the generator contains three diodes D2, D3, D4, as well as three transistors T8, T9, T10. With this embodiment of the rectifier bridge, by appropriately controlling the transistors, both rectification as well as voltage increase are possible. The rectification arrangement thus represents a rectifier and a set-up converter. Using this circuit according to the present invention, a claw-pole generator having an integrated set-up converter can be provided.

By integrating the step-up converter (which functions as a DC voltage converter) into the bridge rectifier, the number of components may be reduced in comparison to the other exemplary embodiments of the present invention described above. The voltage drop at diode D1 of the step-up converter shown in FIG. 2 is eliminated, making the power loss in the exemplary embodiment illustrated in FIG. 4 smaller than in the exemplary embodiment illustrated in FIG. 2, and thus the power efficiency is improved. If transistors T8, T9, T10 are replaced by field-effect transistors, power efficiency is further improved, since the field-effect transistors have a smaller forward power losses in comparison to the diode losses.

As in the further exemplary embodiments according to the present invention, capacitor C smooths out the rectified outlet voltage of the generator. Thus mains voltage UN, which functions to supply load L, can be tapped off, the load being indicated symbolically for the vehicle electrical system user.

What is claimed is:

1. A device for controlling a generator including a diode bridge, comprising:
   a transistor for at least temporarily short-circuiting the diode bridge, the transistor including an interrupter connected parallel to the diode bridge; and
   a capacitor smoothing a current detected at a voltage detection point, wherein the transistor has a base which receives a control signal.

2. The device according to claim 1, wherein the transistor includes a MOS field-effect transistor.

3. The device according to claim 1, wherein the control signal is a modulatable signal, the modulatable signal having a frequency which is adjustable for setting a voltage at an output of the diode bridge that is substantially higher than a predetermined generator output voltage.

4. The device according to claim 3, wherein the modulatable signal includes one of a pulse-width modulated signal and a further signal having a variable mark-to-space ratio.

5. The device according to claim 4, wherein the mark-to-space ratio of the modulatable signal is determined by generating phase voltages from the generator corresponding to higher predetermined voltages at the output of the diode bridge.

6. The device according to claim 1, further comprising:
   a diode element coupled between the diode bridge and the voltage detection point, the diode element allowing a flow of the current only from the generator to the voltage detection point.

7. The device according to claim 1, wherein the transistor includes an insulated gate bipolar transistor.

8. The device according to claim 1, wherein the transistor includes a further semiconductor switching device.

9. The device according to claim 1, wherein the diode bridge includes a resonant controller providing a step-up converter function using predetermined switching principles.

10. The device according to claim 1, wherein the generator is a three-phase generator including three stator inductors.

11. The device according to claim 10, wherein the generator rectifies a current induced in the stator inductors by synchronously generated voltages.

12. A device for controlling a generator including a controlled transistor bridge having a first transistor, comprising:
   a second transistor for at least temporarily short-circuiting the controlled transistor bridge, the second transistor including an interrupter connected to the controlled transistor bridge,
   wherein the second transistor has a base which receives a control signal, and
   wherein the controlled transistor bride provides a step-up converter function.

13. The device according to claim 12, wherein the controlled transistor bridge and the first transistor are controlled to obtain a synchronous rectification.

14. A method for controlling a generator having a diode bridge, comprising the steps of:
   at least temporarily short-circuiting the diode bridge using a transistor, the transistor including an interrupter coupled parallel to the diode bridge;
   providing a control signal to a base of the transistor for controlling the generator; and
   smoothing a current detected at a voltage detection point using capacitor.

15. The method according to claim 14, wherein the transistor includes a MOS field-effect transistor.

16. The method according to claim 14, wherein the control signal is a modulatable signal, the modulatable signal having a frequency which is adjustable for setting a voltage at an output of the diode bridge that is substantially higher than a predetermined generator output voltage.

17. The method according to claim 16, wherein the modulatable signal includes one of a pulse-width modulated signal and a further signal having a variable mark-to-space ratio.

18. The method according to claim 17, further comprising the step of:
   determining the variable mark-to-space ratio to generate phase voltages from the generator corresponding to higher predetermined voltages at the output of the diode bridge.

19. The method according to claim 14, further comprising the step of:
   coupling a diode element between the diode bridge and the voltage detection point, the diode element providing a flow of the current only from the generator to the voltage detection point.

20. The method according to claim 14, further comprising the step of:
   implementing a step-up converter function using predetermined switching principles and a resonance converter.

21. The method according to claim 14, wherein the generator is a three-phase generator including three stator inductors.

22. The method according to claim 14, wherein the transistor includes an insulated gate bipolar transistor.

23. The method according to claim 14, wherein the transistor includes a further semiconductor switching device.

24. The method according to claim 21, wherein the generator rectifies a current induced in the stator inductors by synchronously generated voltages.

25. A method for controlling a generator having a controlled transistor bridge including a first transistor, the method comprising the steps of:
   at least temporarily short-circuiting the controlled transistor bridge using a second transistor, the second transistor including an interrupter coupled to the controlled transistor bridge;

providing a control signal to a base of the second transistor for controlling the generator; and providing a step-up converter function using the controlled transistor bridge.

26. The method according to claim 25, further comprising the step of:

controlling the transistor bridge and the first transistor to obtain a synchronous rectification.

27. A device for controlling a generator, comprising:

a controlled transistor bridge including:

a plurality of first transistors, each one of the plurality of first transistors being coupled to at least another one of the plurality of first transistors, and one of a second transistor coupled to at least one of the plurality of first transistors and a freewheeling diode coupled to at least one of the plurality of first transistors, wherein the controlled transistor bridge provides a step-up converter function.

28. The device according to claim 27, further comprising:

a capacitor smoothing a current detected at a voltage detection point.

29. A device for controlling a generator, comprising:

a rectification arrangement including:

a rectifier including a plurality of diodes, and a step-up converter including a plurality of transistors, each one of the plurality of transistors being coupled to a corresponding one of the plurality of diodes, wherein the plurality of transistors is controlled to enable the rectification arrangement to perform a step-up converter function.

30. The device according to claim 29, further comprising:

a capacitor smoothing a current detected at a voltage detection point.

31. A device for controlling a generator including a controlled transistor bridge having a freewheeling diode, comprising:

a transistor for at least temporarily short-circuiting the controlled transistor bridge, the transistor including an interrupter connected to the controlled transistor bridge, wherein the transistor has a base which receives a control signal, and wherein the controlled transistor bridge provides a step-up converter function.

32. A method for controlling a generator having a controlled transistor bridge including a freewheeling diode, the method comprising the steps of:

at least temporarily short-circuiting the controlled transistor bridge using a transistor, the transistor including an interrupter coupled to the controlled transistor bridge;

providing a control signal to a base of the transistor for controlling the generator; and providing a step-up converter function using the controlled transistor bridge.

33. The device according to claim 29, wherein each one of the plurality of transistors is coupled in series to the corresponding one of the plurality of diodes.

* * * * *

UNITED STATES PATENT AND TRADEMARK OFFICE
CERTIFICATE OF CORRECTION

PATENT NO. : 6,924,629 B1 Page 1 of 1
DATED : August 2, 2005
INVENTOR(S) : Wolfgang Muller et al.

It is certified that error appears in the above-identified patent and that said Letters Patent is hereby corrected as shown below:

<u>Column 6,</u>
Line 7, change "bride" to -- bridge --.

Signed and Sealed this

Thirtieth Day of May, 2006

JON W. DUDAS
*Director of the United States Patent and Trademark Office*